United States Patent
Park et al.

(10) Patent No.: US 8,983,229 B2
(45) Date of Patent: Mar. 17, 2015

(54) METHOD, MEDIUM, AND SYSTEM WITH A COMBINATIONAL PHOTOGRAPH THUMBNAIL

(75) Inventors: Tae-suh Park, Yongin-si (KR);
Kee-eung Kim, Gangdong-gu (KR);
Yeun-bae Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1499 days.

(21) Appl. No.: 11/490,218

(22) Filed: Jul. 21, 2006

(65) Prior Publication Data
US 2007/0065044 A1    Mar. 22, 2007

(30) Foreign Application Priority Data
Sep. 21, 2005  (KR) .......................... 10-2005-0087745

(51) Int. Cl.
*G06K 9/36*       (2006.01)
*G06K 9/00*       (2006.01)
*G06F 17/30*      (2006.01)
*H04N 1/00*       (2006.01)

(52) U.S. Cl.
CPC ...... *G06K 9/00228* (2013.01); *G06F 17/30247* (2013.01); *G06F 17/30274* (2013.01); *H04N 1/00453* (2013.01)
USPC .......................................... 382/284; 382/190

(58) Field of Classification Search
USPC ............................. 382/224, 305, 284; 715/838
See application file for complete search history.

(56) References Cited

U.S. PATENT DOCUMENTS

| | | | | |
|---|---|---|---|---|
| 6,804,684 | B2 * | 10/2004 | Stubler et al. ............................ | 1/1 |
| 6,961,446 | B2 * | 11/2005 | Imagawa et al. .................. | 382/103 |
| 7,216,295 | B2 * | 5/2007 | Wu et al. ........................ | 715/203 |
| 7,577,290 | B2 * | 8/2009 | Ikeda et al. .................... | 382/167 |
| 7,743,343 | B2 * | 6/2010 | Fong et al. ...................... | 715/841 |
| 7,822,233 | B2 * | 10/2010 | Nagaoka et al. .............. | 382/118 |
| 8,102,457 | B1 * | 1/2012 | Anderson ................. | 348/333.01 |
| 2001/0006560 | A1 * | 7/2001 | Gilman et al. ................. | 382/162 |
| 2002/0031262 | A1 * | 3/2002 | Imagawa et al. .............. | 382/190 |

(Continued)

FOREIGN PATENT DOCUMENTS

| | | |
|---|---|---|
| JP | 2000295570 | 10/2000 |
| JP | 2003263148 | 9/2003 |

(Continued)

OTHER PUBLICATIONS

*Image Indexing Using Color Correlograms*, Huang, Jing et al., IEEE Conf. Computer Vision and Pattern Recognition, 1997.

*Primary Examiner* — John Strege
(74) *Attorney, Agent, or Firm* — Staas & Halsey LLP (57) ABSTRACT

A system, medium, and method providing a thumbnail visualizing a plurality of features representing an event to facilitate a search of images. In the system, medium, and method, photographs may be classified into groups based on metadata, e.g., embedded in a photograph file, and a thumbnail may be generated by combining object images extracted from individual representative photographs of the respective groups. The generation of the thumbnail may include extracting metadata from photograph files stored in a photograph folder, classifying the photograph files into groups based on the metadata, selecting representative photographs from the groups using color information included in the metadata, and combining object images extracted from the representative photographs into a thumbnail.

28 Claims, 7 Drawing Sheets

(56) References Cited

U.S. PATENT DOCUMENTS

| | | |
|---|---|---|
| 2002/0039447 A1* | 4/2002 | Shniberg et al. ............... 382/224 |
| 2002/0122659 A1* | 9/2002 | McGrath et al. ............... 386/117 |
| 2002/0135621 A1* | 9/2002 | Angiulo et al. ................ 345/838 |
| 2002/0186257 A1* | 12/2002 | Cadiz et al. .................... 345/838 |
| 2003/0169286 A1* | 9/2003 | Misawa ......................... 345/716 |
| 2008/0019610 A1* | 1/2008 | Matsuzaka et al. ........... 382/284 |

FOREIGN PATENT DOCUMENTS

| | | |
|---|---|---|
| JP | 2004054839 | 2/2004 |
| JP | 2005004419 | 1/2005 |
| JP | 2005018549 | 1/2005 |

* cited by examiner

METHOD, MEDIUM, AND SYSTEM WITH A COMBINATIONAL PHOTOGRAPH THUMBNAIL

CROSS-REFERENCE TO RELATED APPLICATIONS

This application claims priority benefit from Korean Patent Application No. 10-2005-0087745, filed on Sep. 21, 2005, in the Korean Intellectual Property Office, the disclosure of which is incorporated herein by reference in its entirety.

BACKGROUND OF THE INVENTION

1. Field of the Invention

Embodiments of the present invention relate at least to a system, medium, and method for providing a thumbnail visualizing a plurality of features within a plurality of photographs to facilitate the search of the plurality of photographs, and more particularly, to a system, medium, and method for classifying photographs into groups based on metadata embedded in respective photograph files and generating a combinational thumbnail by combining object images extracted from individual representative photographs of the respective groups.

2. Description of the Related Art

In recent years, with the rapid proliferation of digital photographs and individuals being capable of easily photographing images using portable imaging devices (e.g., digital camcorders and digital cameras), one problem that has surfaced is the difficulty in organizing the hundreds, if not thousands, of photographs taken by the individuals.

In the case of a digital camera, for example, it is almost impossible to independently classify a huge number of photographs, e.g., due to restricted interface in device manipulation. Thus, photographs taken using a digital camera are typically automatically titled and stored. In this case, however, it is quite difficult for a user to recognize when and why an individual photograph file was shot based solely on the title of the photograph file.

One approach to overcome this problem is to allow the user to group photograph files into folders, each made based on an event common to photographs, and individually title each folder according to the corresponding event. However, this approach is typically bothersome to the user because the user needs to personally input the title of each folder based on an event common to photograph files right after shooting the photograph files, or upon adding the photographs to a digital library, e.g., on a personal computer. In addition, when the numbers of folders increase and time lapses, it becomes more difficult to remember the separate contents of each folder just based on the title of the folder.

To solve the above problems, many approaches have been proposed. For example, to compensate for drawbacks of this "titling" approach, e.g., corresponding to a conventional event identifier, the Windows XP operating system of the Microsoft Corporation presents thumbnails of four representative photographs for each folder on the icon representing the folder. In other words, thumbnails are displayed as the folder icon so that a user can look at the four thumbnails and identify image files stored in the folder.

However, a thumbnail is an icon made by reducing an image made up of several millions of pixels to a size of merely several thousands of pixels, and therefore, detailed information of objects within the original image is lost during the image reduction. As a result, it is difficult to distinctively identify different objects within the thumbnail image.

To overcome the problem of the above-described thumbnail approach, Japanese Patent Publication No. 2000-295570 (entitled "Electronic Camera Device") discusses a technique of extracting a predetermined area including an auto focus (AF) region in an entire photographed image and creating a thumbnail image from the extracted predetermined area, instead of reducing the entire photographed image, thereby anticipating that the AF region of the image was the region the user believed important.

However, often, the AF region of an image is not representative of the region of the image or objects with the image the user was intending to emphasize or capture, e.g., when a user takes a picture of people and scenery, he/she may focus on the people using a half shutter press, to set the auto focus distance, and then move the camera to obtain a clear image of both of the people and scenery. Similarly, the original AF region while taking a photograph may include people in most of the photographs, such that most of the corresponding thumbnail images include the people's faces, though the surrounding scenery may actually be the emphasis of the photograph. In addition, when a photograph is added to a digital library on a personal computer, for example, and such original AF information is not known, then the AF region may be anticipated, e.g., based upon the usual AF region of images.

In this condition, when many folders include photographs of the same people shot at different locations, thumbnail images of the folders would all correspond to face regions, and therefore, it is difficult to distinguish the folders from one another. It has been reported that people most frequently uses three kinds of information, i.e., "when", "where", and "people" when searching for particular photographs, J. Huang, et al., *Image Indexing Using Color Correlograms*, IEEE Conf. Computer Vision and Pattern Recognition, 1997.

Accordingly, the inventors of the present invention have found that to more effectively search existing thumbnail picture data, it is desirable to enable a user to easily recognize when and where photographs in a folder were shot and who the photographs are based on through thumbnail picture data displayed in the folder.

SUMMARY OF THE INVENTION

Embodiments of the present invention provide a method, medium, and system classifying photographs into a location group and a people group, for example, according to objects of interest when the photographs were taken, based on metadata of photograph files, and combining images of objects extracted from representative photographs of the groups, thereby simultaneously providing people information and location information, for example.

Additional aspects and/or advantages of the invention will be set forth in part in the description which follows and, in part, will be apparent from the description, or may be learned by practice of the invention.

To achieve the above and/or other aspects and advantages, embodiments of the present invention include a method of classifying images using a thumbnail including extracts from a plurality of images of different groupings, the method including classifying images into groups based on respective metadata of the images, selecting representative images from the groups using color information included in the respective metadata, extracting object images from each of the selected representative images, the object images having lower resolution than the selected representative images, and combining the object images into a single thumbnail.

The groups may emphasize different classifying characteristics.

In addition, the method may further include displaying a folder for the images, with an icon of the folder being the thumbnail.

The classifying of the images may include determining whether face detection information exists in a corresponding metadata of an image, and classifying the image into a group for images emphasizing people when the face detection information exists.

Here, when face detection information does not exist in the corresponding metadata, face detection information may be collected from the image through a face detector. In addition, the classifying of the image into the group for images emphasizing people may include calculating a ratio of a face region of the image, and classifying the image into the group for images emphasizing people when the face region ratio exceeds a first threshold value.

Further, the classifying of the image may further include classifying the image into a group for images emphasizing a location when the face detection information does not exist. Here, the classifying of the image into the group for images emphasizing a location may include checking subject distance information in the corresponding metadata of the image, classifying the image into a group emphasizing scenery when the subject distance exceeds a second threshold value, and classifying the image into a group emphasizing things when the subject distance is less than a third threshold value.

The classifying of the images may further include collecting face detection information from an image through a face detector, and classifying the image into a group for images emphasizing people when the face detection information indicates that at least one face is sufficiently emphasized in the image to identify the image as belonging to the group for images emphasizing people.

Here, the classifying of the image into the group for images emphasizing people may include calculating a ratio of a face region of the image, and classifying the image into the group for images emphasizing people based on the face region ratio and a threshold value.

In addition, the classifying of the images may include classifying an image into a group for images emphasizing a location or thing, including checking subject distance information in a corresponding metadata of the image, classifying the image into a group emphasizing scenery based on the subject distance and a first threshold value, and classifying the image into a group emphasizing things based on the subject distance and a second threshold value.

To achieve the above and/or other aspects and advantages, embodiments of the present invention include a method of classifying images using a thumbnail including extracts from a plurality of images of different groupings, the method including classifying images into groups based on respective image information of the images, the groups emphasizing different classifying characteristics, selecting representative images from each of the groups based on corresponding respective image information, extracting object images from each of the selected representative images, the object images having lower resolution than the selected representative images, and combining the object images into a single thumbnail.

The method may further include extracting respective metadata for the images as the respective image information.

In addition, the classifying of the images may include classifying an image into a group for images emphasizing a location or thing, including checking subject distance information from a corresponding image information of the image, classifying the image into a group emphasizing scenery based on the subject distance and a first threshold value, and classifying the image into a group emphasizing things based on the subject distance and a second threshold value.

The classifying of the images may further include collecting face detection information from an image through a face detector, and classifying the image into a group for images emphasizing people when the face detection information indicates that at least one face is sufficiently emphasized in the image to identify the image as belonging to the group for images emphasizing people.

Here, the classifying of the image into the group for images emphasizing people may include calculating a ratio of a face region of the image, and classifying the image into the group for images emphasizing people based on the face region ratio and a threshold value.

To achieve the above and/or other aspects and advantages, embodiments of the present invention include a system for classifying images using a thumbnail including extracts from a plurality of images of different groupings, the system including a grouping unit to classify the images into groups based on respective metadata of the images, a representative photograph selector to select representative images from the groups based on corresponding color information included in the respective metadata, and a thumbnail generator to extract object images from each of the selected representative images, the object images having lower resolution than the selected representative images, and to combine the object images into a single thumbnail.

The groups may emphasize different classifying characteristics, including a people group and a location group.

In addition, the system may include an information extractor extracting the respective metadata from the images. Here, the images may be stored together in a single storage area when the information extractor extracts the metadata from the images.

Further, the system may include a display unit to display a folder for the images, with an icon of the folder being the thumbnail.

To achieve the above and/or other aspects and advantages, embodiments of the present invention include a system for classifying images using a thumbnail including extracts from a plurality of images of different groupings, including a means for classifying images into groups, a means for selecting representative images from each of the groups, a means for extracting object images from each of the selected representative images, the object images having lower resolution than the selected representative images, and a means for combining the object images into a single thumbnail for identifying a storage area storing all of the images and for ease in searching through multiple storage areas.

To achieve the above and/or other aspects and advantages, embodiments of the present invention include at least one medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
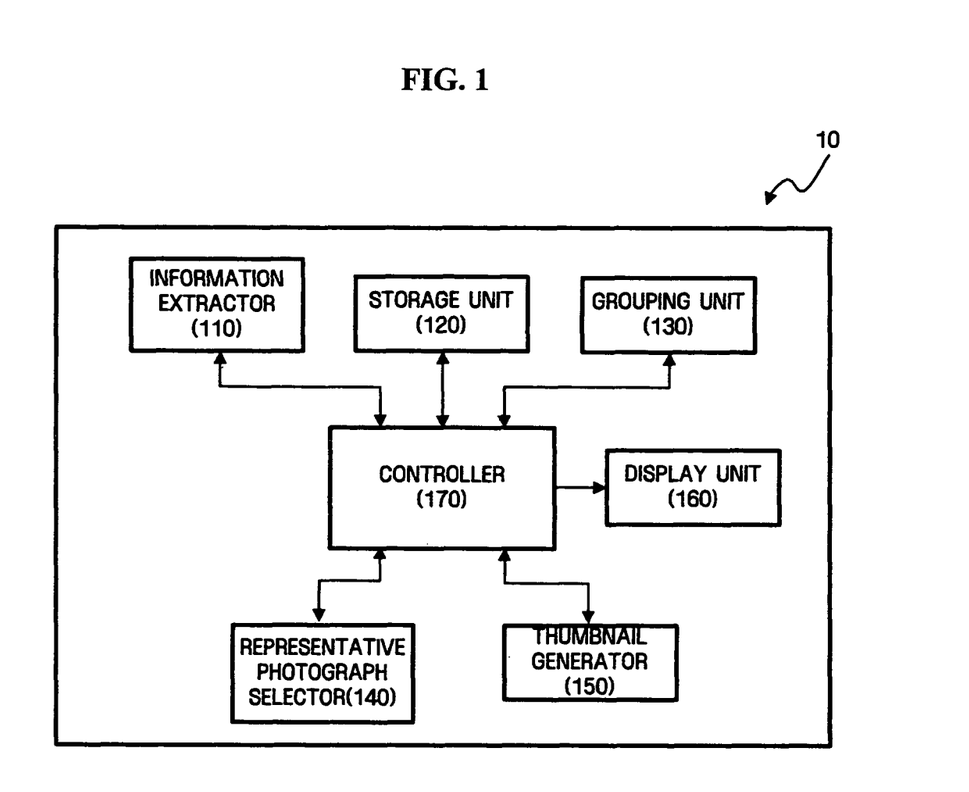
FIG. 1 illustrates a system searching photographs using thumbnails providing multiple grouped information, according to an embodiment of the present invention.

FIG. 1 illustrates a system searching photographs using thumbnails providing multiple grouped information, according to an embodiment of the present invention.

Referring to FIG. 1, a system 10 may include an information extractor 110, a storage unit 120, a grouping unit 130, a representative photograph selector 140, a thumbnail generator 150, a display unit 160, and a controller 170, for example.

The information extractor 110 may extract metadata from a photograph file. Here, the metadata of a photograph file may be obtained mostly from metadata embedded in a JPEG or TIFF format image file, for example, which is a storage format of an image file photographed using a portable imaging device, e.g., a digital camera or a digital camcorder. For example, various kinds of additional information, such as an imaging device manufacturer, a model name, a shooting date, a shutter speed, an f-stop value, a focal length, a subject distance, face detection information, and information on use or non-use of a flash, can be extracted from an exchangeable image file (EXIF) format, for example, which has been initiatively introduced by a Japan Electronics and Information Technology industries Association (JEITA), and which has been settled on as a substantial standard metadata format for digital cameras.

For example, the information extractor 110 may extract metadata embedded in an EXIF format in a JPEG file, for example, and alternatively, when face detection information indicating whether people exist in a photograph is not included in the extracted metadata, extracts the face detection information using a face detector (not shown) and adds it to the metadata. The face detector may use conventional technology for such face detection satisfactorily commercialized like Library Mobile-I of the Neven Vision, which is mounted in NTT DoCoMo's mobile phones, or OKAO of the OMRON. In an embodiment of the present invention, the metadata may be provided in the EXIF format, but it may also be provided in other formats, including an IPTC format, for example.

The storage unit 120 may store photograph files taken by a user, metadata of the photograph files, and grouping information of the grouping unit 130, for example.

In addition, the storage unit 120 may further store information on whether a photograph file is a representative file, which may be calculated based on a color histogram of the photograph file, and a ratio of a face region to an entire region in the photograph file.

The grouping unit 130 may classify photographs into groups based on the metadata extracted by the information extractor 110. The photographs may largely be classified into different groups, e.g., a people group and a location group. The location group may further be subdivided into a scenery group and a things group.

For example, when the face region exists in an object image of a photograph, a ratio of the face region to the entire region of the photograph may be calculated. When the ratio exceeds a first threshold value, determination may be made that the photograph belongs to the people group.

In other words, the grouping unit 130 may check face region information, included in metadata stored in an EXIF of a photograph file, and when it is determined that a face region exists in the photograph file, calculates a face region ratio of the face region to an entire region in the photograph file.

Thereafter, when the face region ratio exceeds the first threshold value, the grouping unit 130 may classify the photograph file into the people group. Here, the first threshold value may be controlled by a user, for example. However, when a face region does not exist in the object image of the photograph file or the face region ratio may not exceed the first threshold value, the grouping unit 130 may classify the photograph file into the location group, for example.

The photograph file classified into the location group may further be subdivided into the scenery group or the things group, according to subject distance information. For example, the grouping unit 130 may check the subject distance information included in the metadata stored in the EXIF of the photograph file. When it is determined that a subject distance exceeds a second threshold value, the grouping unit 130 may classify the photograph file into the scenery group. When it is determined that the subject distance is less than a third threshold value, e.g., in the case of a close-up shooting, the grouping unit 130 may classify the photograph file into the things group. Here, the second threshold value and the third threshold value may be controlled by a user or preset, for example.

Meanwhile, when the subject distance information is omitted from the EXIF, e.g., due to non-support by the imaging device, the subdividing of the photograph files into the scenery group and the things group may be eliminated and the scenery group and the things group may be combined into an upper class, e.g., the location group.

Such a face region ratio may be calculated using the following Equation 1.

$$R = (\text{area of face region in photograph})/(\text{area of entire region of photograph}) \quad \text{Equation 1:}$$

Here, R indicates the face region ratio. When the face region ration R, calculated using Equation 1 does not exceed the first threshold value, it may be determined that people were not objects of interest when the photograph was shot and the photograph may then be classified into the location group.

Figure 2A:
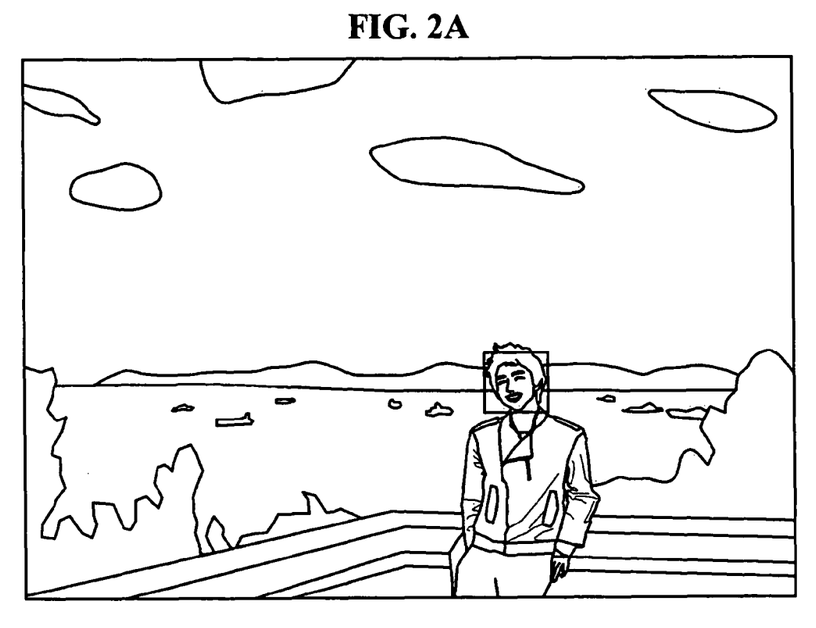
FIGS. 2A and 2B illustrate the application of a calculation of a face region ratio in a photograph file, in a grouping unit included in a system such as in FIG. 1, for example, according to an embodiment of the present invention.
Figure 2B:
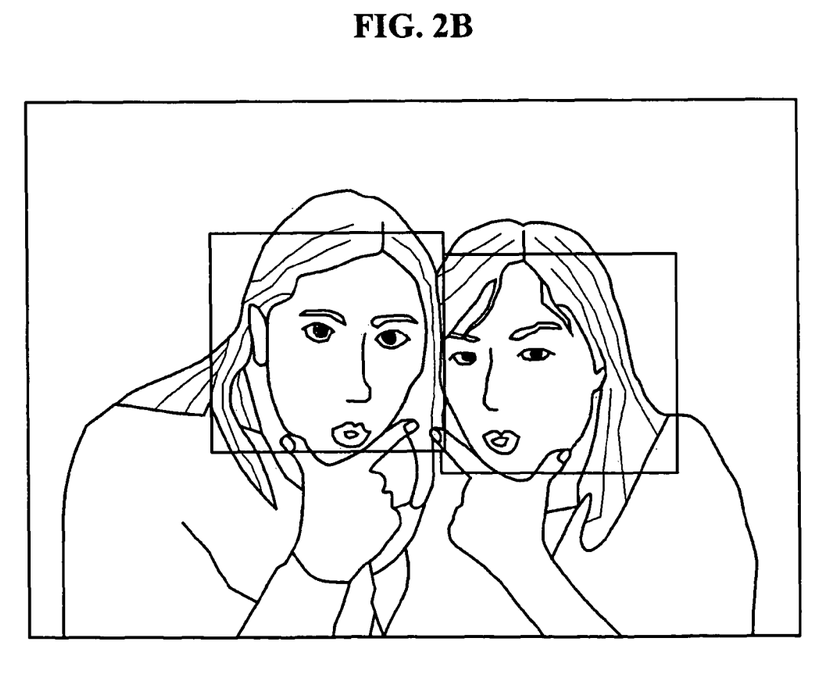

For example, when a photograph includes a person with a background of a mountain, as illustrated in FIG. 2A, if the face region ratio is calculated to be 0.009 and the first threshold value is 0.06, the person in the photograph may be determined to not have been an object of interest when the photograph was shot since the face region ratio is less than the first threshold value, and therefore, the photograph may be classified into the location group. However, in the case of the photograph illustrated in FIG. 2B, if the face region ratio has been calculated as 0.114 and the first threshold value is 0.06, two people in the photograph may be determined to have been the objects of interest when the photograph was shot since the face region ratio exceeds the first threshold value, and therefore, the photograph may be classified into the people group.

The representative photograph selector 140 may select a representative photograph in each of the groups, e.g., the people group, the scenery group, and the things group, using color information and more particularly a color histogram in the metadata extracted by the information extractor 110, for example. Many approaches for selecting a representative photograph using a color histogram have been proposed. In one approach, a Kullback-Leibler divergence may be calculated using the following Equation 2 and a photograph having the largest Y value may be selected as a representative photograph of a current group.

$$Y = Q_i P_{ij} \log(P_{ij}/A_i) \quad (2)$$ Equation 2:

Here, $P_{ij}$ is an individual histogram vector and $A_i$ is an overall mean histogram vector.

The thumbnail generator 150 combines object images extracted from the representative photographs, selected from the respective groups by the representative photograph selector 140, thereby generating a thumbnail.

Figure 3A:
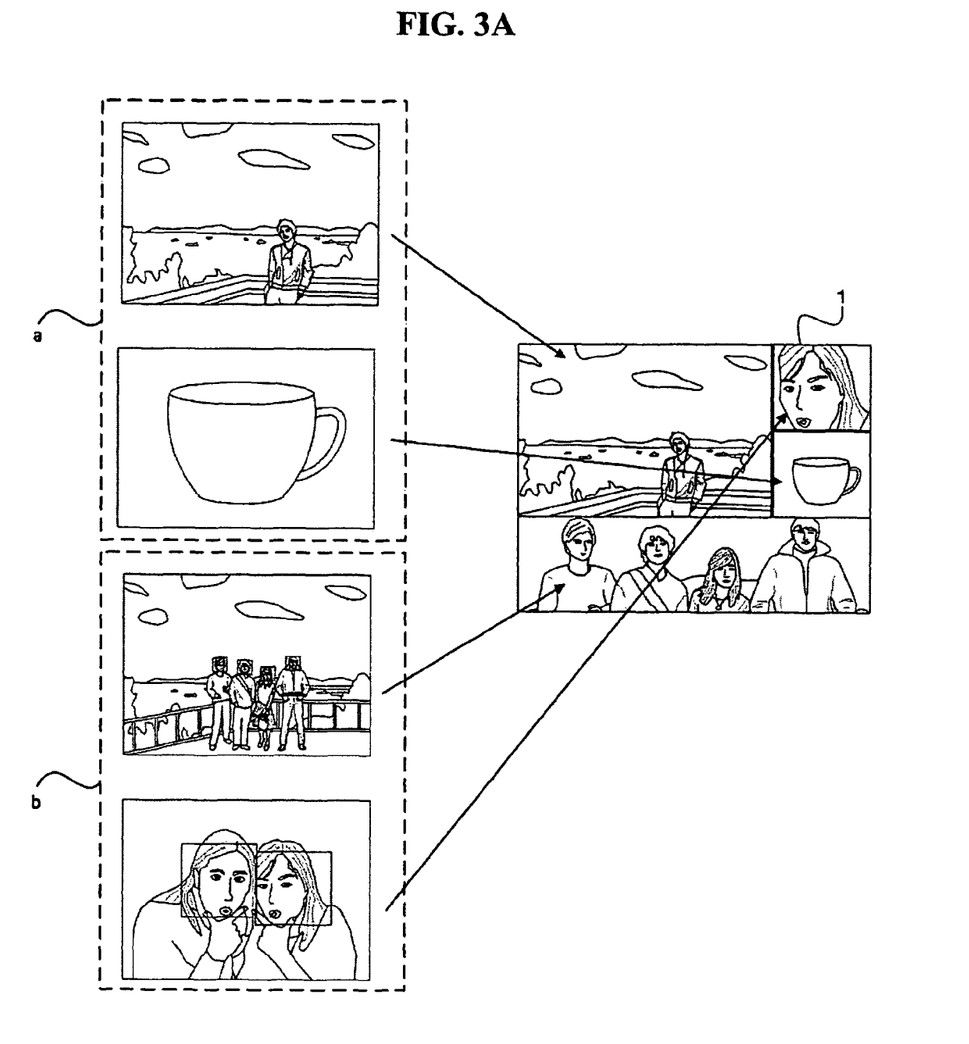
FIGS. 3A and 3B illustrate the generation of thumbnails for folders, by a thumbnail generator included in a system such as in FIG. 1, according to an embodiment of the present invention.
Figure 3B:
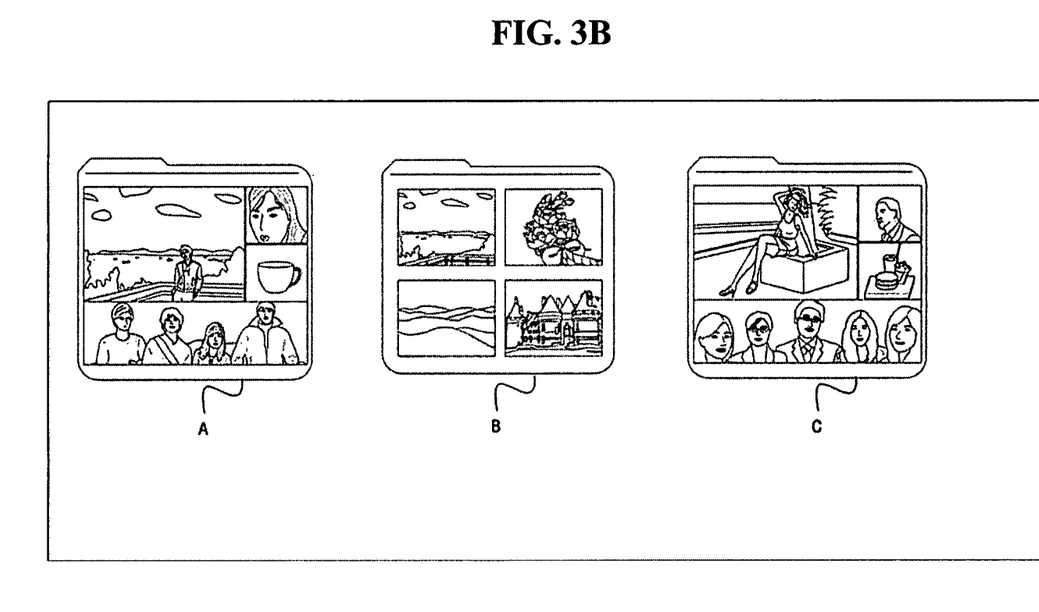

FIGS. 3A and 3B illustrate a procedure of generating a thumbnail providing both people information and location information, for example, by combining representative object images.

Referring to FIG. 3A, a representative photograph may be selected from each of a location group "a" and a people group "b". The representative photograph of the location group "a" may be converted into a thumbnail using a typical method without special modification. However, with respect to the representative photograph of the people group "b", only a face region may be cropped from an object image and made into a thumbnail so that information loss is minimized. The generated thumbnails may then be combined, with appropriate ratios, thereby generating a new composite thumbnail 1 including both people information and location information.

FIG. 3B illustrates a state in which the composite thumbnail generated in the manner described with reference to FIG. 3A, for example, is used as an icon of a photograph folder. The layout of each composite thumbnail may be different, according to attributes of photographs included in a photograph folder. For example, assuming that folder A is a group of photographs of a user and friends shot during a trip, and folder B is a group of photographs of scenery shot during the trip, with respect to the folder A, the photographs of the user and friends may be classified into a people group and a location group. Here, an object image in a representative photograph of each group may be generated as a thumbnail, and thumbnails generated for the people and location groups may be combined into a composite thumbnail displayed as an icon of the folder A. Accordingly, the composite thumbnail for the folder A provides both people information and location information, for example.

Since the folder B has photographs of scenery or things only, thumbnails of representative scenery and things images may be combined into a composite thumbnail for an icon of folder B.

Meanwhile, with respect to each of the folders A and C, the respective composite thumbnails have both people and location images. Since both of the people and location images are included in the thumbnail, the user can easily distinguish different places where the photographs were shot even when the photographs include the same people. As illustrated, the photographs with folder C are more directed toward the people, rather then the location, such that the images of the people may be cropped when generating the overall thumbnail for the folder C.

In addition, the number of thumbnails included in the composite thumbnail of a folder and the number of image files selected from a group in the folder may be differently set by the thumbnail generator 150, the user, or potentially may be preset.

Accordingly, the user can recognize the characteristics of photographs stored in a photograph folder and more easily identify where the photographs were shot and who is in the photographs by just looking at the composite thumbnail without having to open the photograph folder.

As illustrated in FIG. 1, the display unit 160 may thus display the composite thumbnail, e.g., generated by the thumbnail generator 150, as an icon of the photograph folder.

The controller 180 may also control data flow among modules and operating order according to a stored program, for example, noting that alternative embodiments are equally available.

Figure 4:
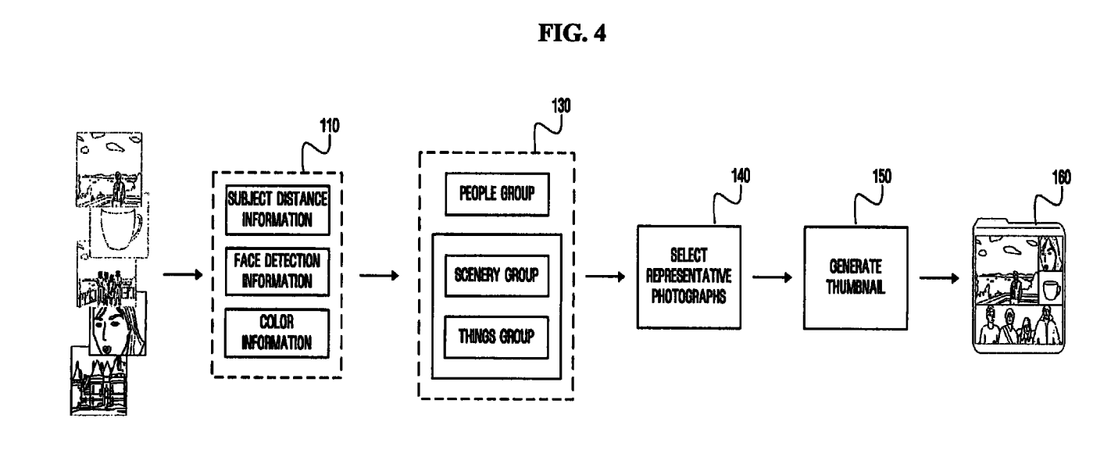
FIG. 4 illustrates the operations of a system for generating thumbnails providing people information and location information, according to another embodiment of the present invention.

FIG. 4 illustrates the operations of a system for generating thumbnails providing people information and location information, for example, and display of the thumbnail information to ease searching, according to an embodiment of the present invention.

When a plurality of photograph files exist in a photograph folder, the information extractor 110 may extract subject distance information, face detection information, and color information from metadata of the photograph files, if the same has not previously been extracted. The grouping unit 130 may classify photographs into a people group, a scenery group, and a things group, for example, based on the extracted information, noting that alternative group embodiments are equally available. The representative photograph selector 140 may select representative photographs in each of the groups using the color information, And the thumbnail generator 150 may combine object images extracted from the representative photographs, thereby generating a composite thumbnail. The display unit 160 may then display the composite thumbnail as an icon of the photograph folder.

Figure 5:
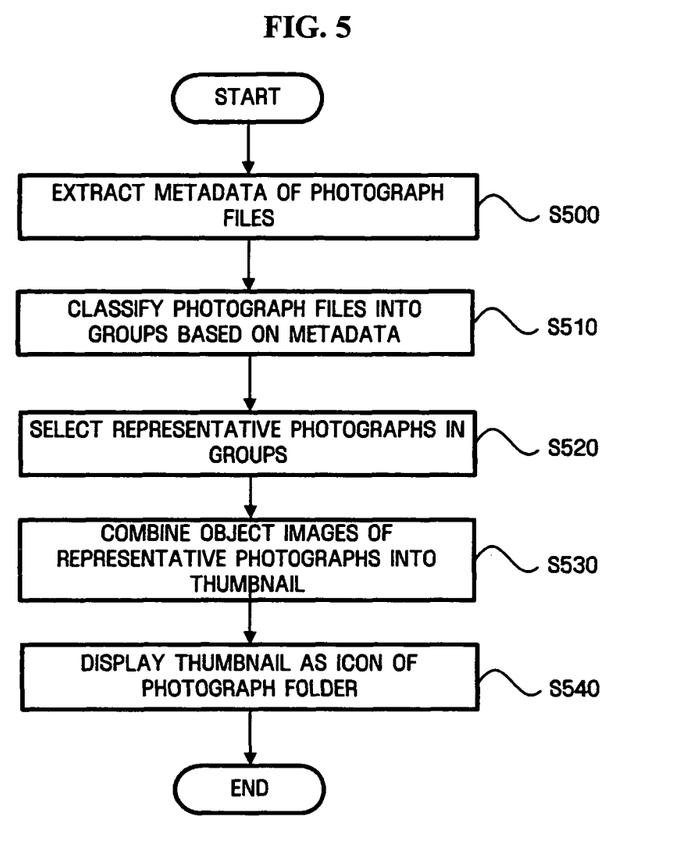
FIG. 5 illustrates a method for generating and displaying thumbnails of photographs in folders providing people information and location information, according to an embodiment of the present invention.

FIG. 5 illustrates a method of generating thumbnails including people information and location information, for example, according to an embodiment of the present invention.

In operation S500, the information extractor 110 may extract metadata from photograph files included in a photograph folder, e.g., stored in the storage unit 120, if the metadata has not previously been extracted. The metadata may include various kinds of additional information, such as an imaging device manufacturer, a model name, a shooting date, a shutter speed, an f-stop value, a focal length, a subject distance, face detection information, and information on use or non-use of a flash, for example.

In operation S510, the grouping unit 130 may classify the photograph files based on the metadata, such as based on the subject distance information and the face detection information. Here, the photograph files may be then be classified into a people group, a scenery group, and a things group, for example, again noting that alternative groupings are available.

In operation S520, the representative photograph selector 140 then selects representative photographs from each of the groups, for example, using color information, such as a color histogram, in the metadata extracted by the information extractor 110, further noting that alternative representative photograph selection techniques are equally applicable.

In operation S530, the thumbnail generator 150 may then combine object images, extracted from the respective representative photographs, into a thumbnail. Accordingly, the thumbnail including the combined people, scenery, and things images may be set to be the icon for the photograph folder.

Thereafter, in operation S540, the display unit 160 may display the composite thumbnail as the icon of the photograph folder.

Figure 6:
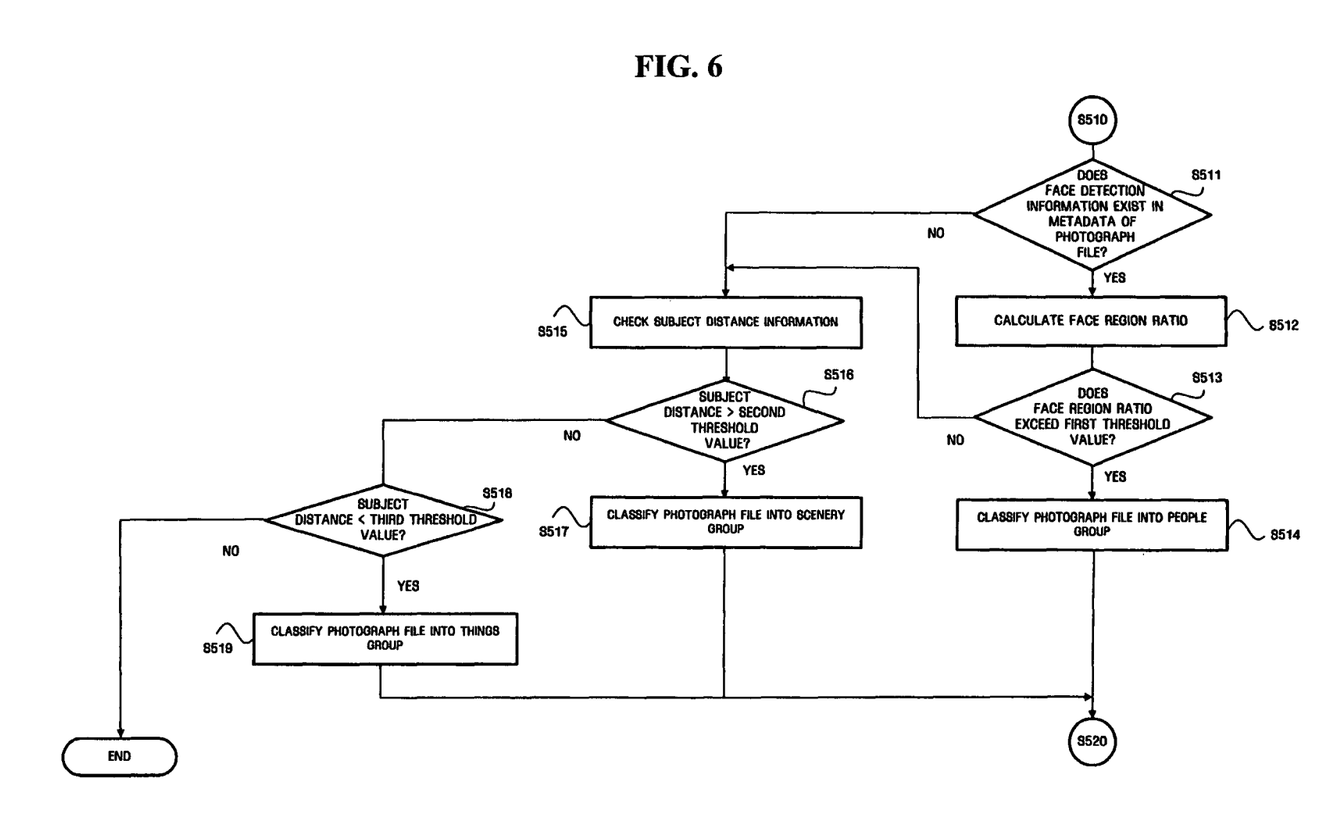
FIG. 6 illustrates a process of grouping photograph files, according to an embodiment of the present invention.

FIG. 6 illustrates a process of grouping photograph files, according to an embodiment of the present invention.

In operation S510, as described above, the grouping unit 130 may classify the photograph files based on the metadata, such as the subject distance information and the face detection information, of the photograph files.

In detail, in operation S511 the grouping unit 130 may identify whether face detection information exists in the metadata of a photograph file. When the face detection information exists, a face region ratio may be calculated in operation S512.

When the face region ratio exceeds a first threshold value, in operation S513, the grouping unit 130 may determine that people were the object of interest when the photograph file was shot and may classify the photograph file into the people group, in operation S514.

When face detection information does not exist in the metadata of a photograph file, in operation S511, the grouping unit 130 may determine that people were not an object of interest when the photograph file was shot, and may classify the photograph file into a location group, and may then checks the subject distance information, in operation S515.

When subject distance exceeds a second threshold value, in operation S516, the grouping unit 130 may classify the photograph file into the scenery group, in operation S517. When the subject distance does not exceed the second threshold value, whether the subject distance is less than a third threshold value may be determined, in operation S518.

When the subject distance is less than the third threshold value, e.g., the photograph file was shot in a close-up mode, and the subject distance does not exceed a second threshold value, in operation S516, the grouping unit 130 may classify the photograph file into the things group, in operation S519. When it is determined that the subject distance is greater than the third threshold value, the grouping unit 130 may determine that the photograph file does not belong to any of the groups and does not classify the photograph file into any particular group. Here, the second threshold value and the third threshold value may be controlled by the user, for example, or preset.

Meanwhile, the face region ratio does not exceed the first threshold value, in operation S513, the grouping unit 130 may determine that the face region is very small, although the face region exists, and may classify the photograph file into the location group and performs operations S515 through S518.

As described above, embodiments of the present invention combine into a thumbnail at least two different kinds/groupings of information, e.g., people and location information, useful for expressing features of photographs stored in a folder, which provides a substantially minimum search unit under a thumbnail-based photograph search environment, thereby achieving the following effects.

Firstly, since a plurality of strong features complementing each other are provided, search time may be decreased and a search success ratio can be increased when a large number of images are searched.

Secondly, even when the same people appear in different shooting places or no people appear in photographs, visual distinctiveness between folders may be maintained.

Thirdly, photograph search and management can be easily performed in a device such as TV inconvenient to input characters unlike a computer, for example.

Above, embodiments of the present invention have been described with reference to the accompanying drawings, e.g., illustrating block diagrams and flowcharts, for classifying photographs into a location group and a people group, for example. It will be understood that each block of such flowchart illustrations, and combinations of blocks in the flowchart illustrations, may be implemented by computer readable instructions of a medium. These computer readable instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks.

These computer program instructions may be stored/transferred through a medium, e.g., a computer usable or computer-readable memory, that can instruct a computer or other programmable data processing apparatus to function in a particular manner. The instructions may further produce another article of manufacture that implements the function specified in the flowchart block or blocks.

In addition, each block of the flowchart illustrations may represent a module, segment, or portion of code, for example, which makes up one or more executable instructions for implementing the specified logical operation(s). It should also be noted that in some alternative implementations, the operations noted in the blocks may occur out of order. For example, two blocks shown in succession may in fact be executed substantially concurrently or the blocks may sometimes be executed in the reverse order, depending upon the functionality involved.

In embodiments of the present invention, the term "unit", as potentially used herein, may mean, but is not limited to, a software or hardware component, such as a Field Programmable Gate Array (FPGA) or Application Specific Integrated Circuit (ASIC), which performs certain tasks. A module or unit may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, noting that alternative embodiments are equally available. In addition, the functionality provided for by the components and modules may be combined into fewer components and modules or further separated into additional components and modules. Further, such a persistence compensation apparatus, medium, or method may also be implemented in the form of a single integrated circuit, noting again that alternative embodiments are equally available.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for searching for a photograph using a thumbnail, the method comprising:
   extracting an object image from a first image among a plurality of images, the object image representing part of the first image;
   generating a composite thumbnail which combines the extracted object image and the plurality of images; and
   displaying an icon on a folder, the icon including the generated composite thumbnail.

2. The method of claim 1, wherein the generated composite thumbnail includes a combination of object images.

3. The method of claim 1, further comprising extracting a representative image based on metadata of the first image, and extracting the object image representing part of the first image from the extracted representative image.

4. An apparatus for searching for a photograph using a thumbnail, the apparatus comprising:
   a thumbnail creating unit which extracts an object image from a first image among a plurality of images, the object image representing part of the first image, and generates a composite thumbnail which combines the extracted object image and the plurality of images; and
   a display unit which displays an icon on a folder, the icon including the generated composite thumbnail.

5. The apparatus of claim 4, wherein the generated composite thumbnail includes a combination of object images.

6. The apparatus of claim 4, wherein the thumbnail creating unit extracts a representative image based on metadata of the first image, and extracts the object image representing part of the first image from the extracted representative image.

7. A method for searching for a photograph using a thumbnail, the method comprising:
   classifying images into groups according to one or more conditions set in advance based on metadata;
   extracting representative images from the images included in the groups using the metadata;
   extracting object images from the extracted representative images, respectively, the object images representing a whole or part of the images;
   combining the extracted object images to create a thumbnail; and
   displaying the created thumbnail.

8. The method of claim 7, wherein the classifying images into groups according to one or more conditions set in advance comprises classifying images into groups based on at least one of date information of the metadata, face detection information, and subject distance information.

9. The method of claim 7, wherein an object image included in a face group among the object images of the extracted representative images is cropped into an object image representing a part.

10. A method for searching for a photograph using a thumbnail, the method comprising:
    classifying images into groups according to one or more conditions set in advance based on metadata;
    extracting representative images from the images included in the groups using the metadata;
    extracting object images from the extracted representative images, respectively, the object images representing a whole or part of the images;
    combining the extracted object images to create a thumbnail; and
    displaying the created thumbnail,
    wherein the classifying of the images comprises:
    determining whether face detection information exists in a corresponding metadata of an image; and
    classifying the image into a group for images emphasizing people when the face detection information exists.

11. The method of claim 10, wherein, when face detection information does not exist in the corresponding metadata, face detection information is collected from the image through a face detector.

12. A method for searching for a photograph using a thumbnail, the method comprising:
    classifying images into groups according to one or more conditions set in advance based on metadata;
    extracting representative images from the images included in the groups using the metadata;
    extracting object images from the extracted representative images, respectively, the object images representing a whole or part of the images;
    combining the extracted object images to create a thumbnail; and
    displaying the created thumbnail,
    wherein the classifying of the images comprises:
    determining whether face detection information exists in a corresponding metadata of an image; and
    classifying the image into a group for images emphasizing people when the face detection information exists,
    wherein the classifying of the image into the group for images emphasizing people comprises:
    calculating a ratio of a face region to an entire region of the image; and
    classifying the image into the group for images emphasizing people when the face region ratio exceeds a first threshold value.

13. The method of claim 10, wherein the classifying of the image further comprises classifying the image into a group for images emphasizing a location when the face detection information does not exist.

14. A method for searching for a photograph using a thumbnail, the method comprising:
    classifying images into groups according to one or more conditions set in advance based on metadata;
    extracting representative images from the images included in the groups using the metadata;
    extracting object images from the extracted representative images, respectively, the object images representing a whole or part of the images;
    combining the extracted object images to create a thumbnail; and
    displaying the created thumbnail,
    wherein the classifying of the images comprises:
    determining whether face detection information exists in a corresponding metadata of an image; and
    classifying the image into a group for images emphasizing people when the face detection information exists,
    wherein the classifying of the image further comprises classifying the image into a group for images emphasizing a location when the face detection information does not exist,
    wherein the classifying of the image into the group for images emphasizing a location comprises:
    checking subject distance information in the corresponding metadata of the image;
    classifying the image into a group emphasizing scenery when the subject distance exceeds a second threshold value; and
    classifying the image into a group emphasizing things when the subject distance is less than a third threshold value.

15. The method of claim 7, wherein the classifying of the images comprises:

collecting face detection information from an image through a face detector; and classifying the image into a group for images emphasizing people when the face detection information indicates that at least one face is sufficiently emphasized in the image to identify the image as belonging to the group for images emphasizing people.

16. A method for searching for a photograph using a thumbnail, the method comprising:

classifying images into groups according to one or more conditions set in advance based on metadata;

extracting representative images from the images included in the groups using the metadata;

extracting object images from the extracted representative images, respectively, the object images representing a whole or part of the images;

combining the extracted object images to create a thumbnail; and displaying the created thumbnail, wherein the classifying of the images comprises:

collecting face detection information from an image through a face detector; and classifying the image into a group for images emphasizing people when the face detection information indicates that at least one face is sufficiently emphasized in the image to identify the image as belonging to the group for images emphasizing people, wherein the classifying of the image into the group for images emphasizing people comprises:

calculating a ratio of a face region to an entire region of the image; and classifying the image into the group for images emphasizing people based on the face region ratio and a threshold value.

17. A method for searching for a photograph using a thumbnail, the method comprising:

classifying images into groups according to one or more conditions set in advance based on metadata;

extracting representative images from the images included in the groups using the metadata;

extracting object images from the extracted representative images, respectively, the object images representing a whole or part of the images;

combining the extracted object images to create a thumbnail; and displaying the created thumbnail, wherein the classifying of the images comprises classifying an image into a group for images emphasizing a location or thing, comprising:

checking subject distance information in a corresponding metadata of the image;

classifying the image into a group emphasizing scenery based on the subject distance and a first threshold value; and classifying the image into a group emphasizing things based on the subject distance and a second threshold value.

18. An apparatus for searching for a photograph using a thumbnail, the apparatus comprising:

a grouping unit which classifies images into groups according to one or more conditions set in advance based on metadata;

a representative photograph selecting unit which extracts representative images from the images included in the groups using the metadata;

a thumbnail creating unit which extracts object images from the extracted representative images, respectively, the object images representing a whole or part of the images, and combines the extracted object images to create a thumbnail; and a display unit which displays the created thumbnail.

19. The apparatus of claim 18, wherein the grouping unit classifies images into groups according to one or more conditions set in advance based on at least one of date information of the metadata, face detection information, and subject distance information.

20. The apparatus of claim 18, wherein the thumbnail creating unit crops an object image included in a face group among the object images of the extracted representative images into an object image representing a part.

21. An apparatus for searching for a photograph using a thumbnail, the apparatus comprising:

a grouping unit which classifies images into groups according to one or more conditions set in advance based on metadata;

a representative photograph selecting unit which extracts representative images from the images included in the groups using the metadata;

a thumbnail creating unit which extracts object images from the extracted representative images, respectively, the object images representing a whole or part of the images, and combines the extracted object images to create a thumbnail; and a display unit which displays the created thumbnail, wherein the grouping unit determines whether face detection information exists in a corresponding metadata of an image, and classifies the image into a group for images emphasizing people when the face detection information exists.

22. The apparatus of claim 21, wherein, when face detection information does not exist in the corresponding metadata, face detection information is collected from the image through a face detector.

23. An apparatus for searching for a photograph using a thumbnail, the apparatus comprising:

a grouping unit which classifies images into groups according to one or more conditions set in advance based on metadata;

a representative photograph selecting unit which extracts representative images from the images included in the groups using the metadata;

a thumbnail creating unit which extracts object images from the extracted representative images, respectively, the object images representing a whole or part of the images, and combines the extracted object images to create a thumbnail; and a display unit which displays the created thumbnail, wherein the grouping unit determines whether face detection information exists in a corresponding metadata of an image, and classifies the image into a group for images emphasizing people when the face detection information exists, wherein the grouping unit calculates a ratio of a face region to an entire region of the image, and classifies the image into the group for images emphasizing people when the face region ratio exceeds a first threshold value.

24. The apparatus of claim 21, wherein the grouping unit classifies the image into a group for images emphasizing a location when the face detection information does not exist.

25. An apparatus for searching for a photograph using a thumbnail, the apparatus comprising:

a grouping unit which classifies images into groups according to one or more conditions set in advance based on metadata;

a representative photograph selecting unit which extracts representative images from the images included in the groups using the metadata;

a thumbnail creating unit which extracts object images from the extracted representative images, respectively, the object images representing a whole or part of the images, and combines the extracted object images to create a thumbnail; and a display unit which displays the created thumbnail, wherein the grouping unit determines whether face detection information exists in a corresponding metadata of an image, and classifies the image into a group for images emphasizing people when the face detection information exists, wherein the grouping unit classifies the image into a group for images emphasizing a location when the face detection information does not exist, wherein the grouping unit checks subject distance information in the corresponding metadata of the image, classifies the image into a group emphasizing scenery when the subject distance exceeds a second threshold value, and classifies the image into a group emphasizing things when the subject distance is less than a third threshold value.

26. The apparatus of claim 18, wherein the grouping unit collects face detection information from an image through a face detector, and classifies the image into a group for images emphasizing people when the face detection information indicates that at least one face is sufficiently emphasized in the image to identify the image as belonging to the group for images emphasizing people.

27. An apparatus for searching for a photograph using a thumbnail, the apparatus comprising:

a grouping unit which classifies images into groups according to one or more conditions set in advance based on metadata;

a representative photograph selecting unit which extracts representative images from the images included in the groups using the metadata;

a thumbnail creating unit which extracts object images from the extracted representative images, respectively, the object images representing a whole or part of the images, and combines the extracted object images to create a thumbnail; and a display unit which displays the created thumbnail, wherein the grouping unit collects face detection information from an image through a face detector, and classifies the image into a group for images emphasizing people when the face detection information indicates that at least one face is sufficiently emphasized in the image to identify the image as belonging to the group for images emphasizing people, wherein the grouping unit calculates a ratio of a face region to an entire region of the image, and classifies the image into the group for images emphasizing people based on the face region ratio and a threshold value.

28. An apparatus for searching for a photograph using a thumbnail, the apparatus comprising:

a grouping unit which classifies images into groups according to one or more conditions set in advance based on metadata;

a representative photograph selecting unit which extracts representative images from the images included in the groups using the metadata;

a thumbnail creating unit which extracts object images from the extracted representative images, respectively, the object images representing a whole or part of the images, and combines the extracted object images to create a thumbnail; and a display unit which displays the created thumbnail, wherein the grouping unit checks subject distance information in a corresponding metadata of the image, classifies the image into a group emphasizing scenery based on the subject distance and a first threshold value, and classifies the image into a group emphasizing things based on the subject distance and a second threshold value.

\* \* \* \* \*